C. E. WHITE.
HARROW.
APPLICATION FILED MAY 29, 1908.
951,924.
Patented Mar. 15, 1910.
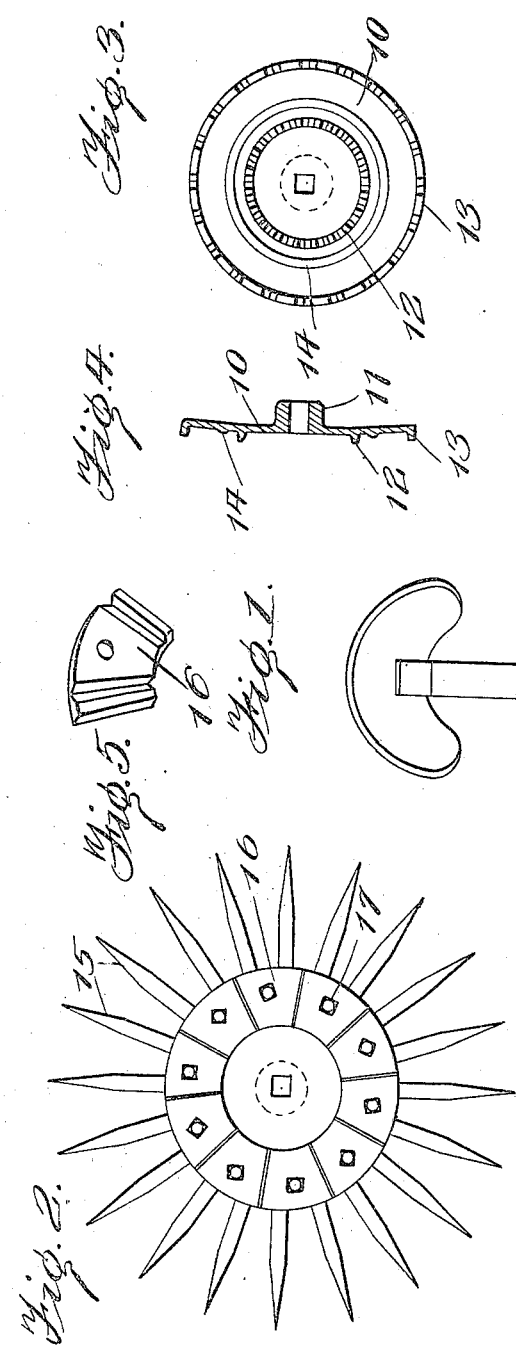
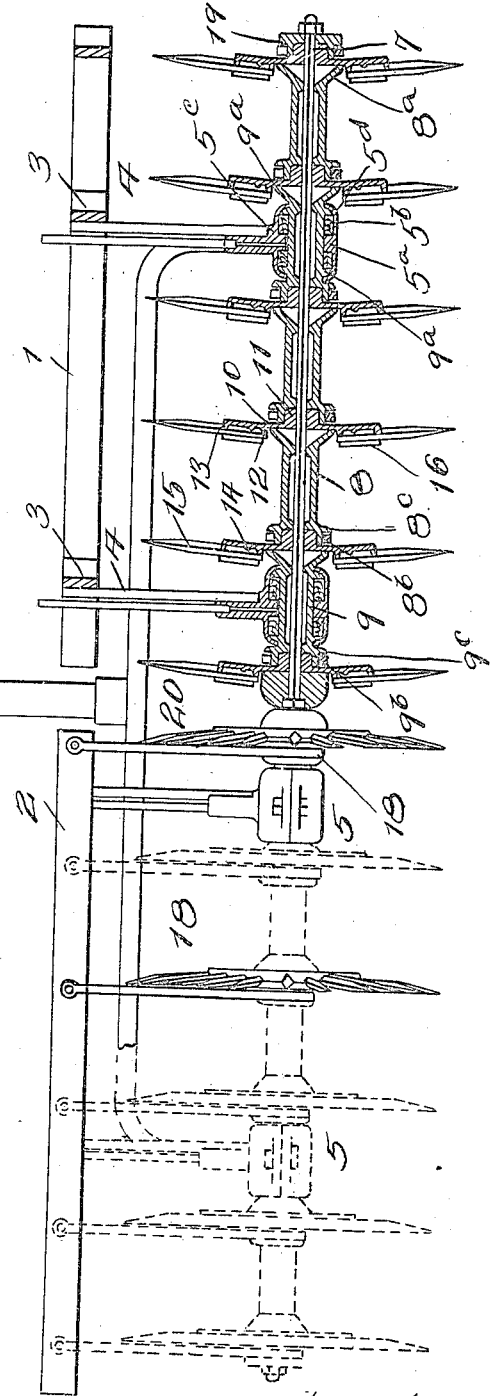
Witnesses
B. J. [illegible]
A. G. Russell
Inventor
Chas. E. White
By H. H. Bliss
Attorney

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

HARROW.

951,924.  Specification of Letters Patent.  Patented Mar. 15, 1910.

Application filed May 29, 1908. Serial No. 435,830.

*To all whom it may concern:*

Be it known that I, CHARLES E. WHITE, a citizen of the United States, residing at Moline, in the county of Rock Island and State of Illinois, have invented certain new and useful Improvements in Harrows, of which the following is a specification, reference being had therein to the accompanying drawing.

This invention relates to harrows which are adapted for the renovation of alfalfa, or other crops of a similar character. In implements of this character use is made of disks with outwardly extending spike teeth. These toothed disks or heads are arranged in gangs and roll over the ground in much the same manner as do the disks of the ordinary disk harrow, their action, however, being quite different.

The object of my invention is to improve the construction of the heads and also the method of mounting the heads and the scraper bars with which the heads are provided.

In the accompanying drawing, which illustrates a practical embodiment of my invention, Figure 1 is a rear elevation of the harrow, the right gang of tools being shown in section. Fig. 2 is a face view of one of the heads. Fig. 3 is a face view of the head disk. Fig. 4 is a central sectional view of the said disk, and Fig. 5 is a perspective view of one of the teeth clamping plates.

The frame of the implement is preferably of the disk harrow type in which two gang frames are pivotally connected to the draft bars, and are provided with means to effect their angular adjustment in relation to the line of draft. Inasmuch as this type of frame is well known, I have shown in the drawings only the main frame parts directly associated with the tool gangs.

Each of the gang frames comprises transverse bars 1 and 2 which are united by angle bars 3. Depending bars 4 are secured to the bars 3 and at their lower ends carry the bearing boxes 5, 5 of the tool gangs.

Each tool gang comprises a plurality of heads or toothed disks which are mounted on a gang bolt 7, and maintained in suitable spaced relation by spools 8, 9. The spacing spools 9 are specially constructed to receive the bearing boxes 5, being formed with outturned flanges $9^a$ between which and a central flange $5^a$ of the boxes are mounted wooden bearing rings $5^b$. The bearing boxes are preferably formed in two parts $5^c$ and $5^d$, the former having an up-standing extension to which the depending bar 4 is bolted.

Each of the toothed heads comprises a main disk part 10, having on one face a hub 11 and on its other face two concentric series of regularly spaced lugs 12 and 13. Between these two series of lugs is a circular bead 14. A series of spike teeth 15 extend radially from the periphery of the disk, being secured in position between lugs 12 and 13 by means of the segmental clamping plates 16. These plates are formed with grooves on their inner faces to fit the teeth 15 and, in the preferred form, each plate is of a size to engage two of the teeth, and is provided with a clamping bolt 17, which serves to secure the parts rigidly together. I prefer to form the grooves of the clamping plates 16, and also the lugs 12 and 13 of the disk, with beveled sides so as to receive the spike teeth cornerwise between the disk and the clamping plates, a firmer clamping action being thus secured. Each of the teeth 15 is provided with a notch to receive the bead 14 so that the teeth are firmly locked against endwise movement. With the construction described, the spike teeth are very securely fixed to the disk, and at the same time any individual tooth may be easily and quickly removed in the case of breakage or for repairs, by simply loosening a single clamping bolt.

Each of the spacing spools 8, 9 is formed at one end with a flange $8^a$ or $9^a$, that extends axially outward so as to form a wide bearing engagement with the disk of the adjacent head. At the other end the spool is formed with a hollow, cylindrical enlargement $8^b$ or $9^b$ adapted to pass over the hub 11 of the adjacent disk, and, like the flange $8^a$, form a wide bearing engagement with said disk. On the enlargement $8^b$, or $9^b$ is formed a flange or collar $8^c$ or $9^c$, which serves to prevent the lateral displacement of the scraper bar 18 with which each head is provided.

Each of the scraper bars 18 is secured at its upper end to the transverse bar of the gang frame and at its lower end is bent partially around the cylindrical enlargement of one of the spacing spools between its flange $8^c$ and the face of the adjacent disk. Thus mounted, each of the scraper bars is securely held against lateral displacement. In the case of the outside scraper bar, a flanged collar 19 serves to hold the lower end of the bar against lateral displacement. The inner head of each gang carries a bumper 20 secured in position by the gang bolt in the usual way.

With the tool gang thus constructed and mounted, it will be seen that as the implement is moved over the ground, the heads, spacing spools and gang bolt of each gang rotate in unison as in the case of the disk harrow.

It will be observed that in the construction of the heads and spacing spools, as above set forth, the flanged ends of the spools have a very wide bearing against the opposite faces of the heads. This greatly stiffens the gang of tools as a whole and I consider it a feature of considerable practical importance.

What I claim is:

1. A spike toothed head comprising in combination, a disk having on one face a series of regularly spaced lugs, a series of individually detachable radially extending spike teeth disposed between said lugs and having an offset engagement with the disk, and an annular series of clamping plates, each engaging a plurality of the teeth, and means for binding each clamping plate to the disk and thereby rigidly securing the teeth in position.

2. A spike toothed head comprising in combination a disk having on one face a series of regularly spaced lugs, a series of radially extending individually detachable spike teeth disposed between said lugs and each having an offset engagement with the disk, an annular series of clamping plates, each engaging a pair of the spike teeth, and a clamping bolt between each pair of teeth for securing each clamping plate to the disk.

3. A spike toothed head comprising in combination, a disk having on one face two concentric circular series of regularly spaced lugs, and a circular bead or flange lying between the said series of lugs, a series of individually detachable spike teeth disposed between the said lugs and extending from the periphery of the disk, each tooth having a notch to receive the aforesaid bead of the disk, and means for rigidly clamping the teeth to the disk.

4. In an implement of the class set forth, the combination of the gang frame, the gang bolt or axle carried by the frame, the series of toothed heads mounted on said bolt, each head comprising a disk with a hub flange on one face, and a series of spike teeth mounted on the other face of the disk, a series of spacing spools interposed between the respective heads on the gang bolt, each spool having a flanged hollow enlargement at one end to receive the hub of the adjacent disk and permit the enlarged end of the spool to engage the face of said disk, and a series of scraper bars for the heads, each bar being secured at its upper end to the gang frame and at its lower end bent partially around the spool enlargement between the flange thereof and the face of the adjacent disk.

5. A spike toothed head comprising in combination a disk having on one face a circular series of regularly spaced lugs and a circular bead or flange, a series of individually detachable spike teeth disposed between the said lugs and extending from the periphery of the disk, each tooth having a notch to receive the aforesaid bead of the disk, and means for rigidly clamping the teeth to the disk.

6. A spike toothed head comprising in combination a disk having on one face a circular series of regularly spaced lugs and a circular bead or flange, a series of individually detachable spike teeth disposed between said lugs and extending from the periphery of the disk, each tooth having a notch to receive the aforesaid bead of the disk, a series of clamping plates, each engaging a plurality of the teeth, and means for binding each clamping plate to the disk and thereby rigidly securing the teeth in position.

7. A spike toothed head comprising in combination a disk having on one face a circular series of regularly spaced lugs and a circular bead or flange, a series of individually detachable spike teeth disposed between said lugs and extending from the periphery of the disk, each tooth having a notch to receive the aforesaid bead of the disk, a series of clamping plates each engaging a pair of the spike teeth, and a clamping bolt between each pair of teeth for securing a clamping plate to the disk.

In testimony whereof I affix my signature, in presence of two witnesses.

CHARLES E. WHITE.

Witnesses:
N. A. PETERSON,
J. V. LOCKHART.